3,236,784
POLYMERIZATION OF CYCLIC ETHERS BY DIAZONIUM SALTS OF PERCHLORIC OR PERFLUOROCARBOXYLIC ACIDS
Edgar Fischer, Frankfurt am Main, Germany, assignor to Farbwerke Hoechst Aktiengesellschaft vormals Meister Lucius & Bruning, Frankfurt am Main, Germany, a corporation of Germany
No Drawing. Filed May 22, 1962, Ser. No. 196,596
Claims priority, application Germany, May 26, 1961, F 34,021
19 Claims. (Cl. 260—2)

The present invention relates to a process for polymerizing cyclic ethers, a term intended to include cyclic acetals, with the aid of aryldiazonium salts of perchloric acid and perfluorocarboxylic acids. Especially suitable are the aryldiazonium salts of saturated aliphatic perfluorocarboxylic acids having 2 to 10 carbon atoms, for example the salts of trifluoroacetic acid, perfloropropionic acid, perfluorobutyric acid, perfluorocaprylic acid and perfluoroglutaric acid.

We have found that certain aryldiazonium salts, carrying appropriate substituents, of perchloric acid or perfluorocarboxylic acids can be contacted with the compound or compounds to be polymerized without immediate polymerization taking place, the polymerization then being initiated by an additional polymerization activation. Such additional activation may be brought about by supplying energy in the form of heat and/or light.

We have also found that aryldiazonium salts of perchloric acid or perfluorocarboxylic acids exhibit very different reactivities depending on the constitution and structure of their aryl radical or the substituents linked to the aryl radical. The aryldiazonium salts of perchloric acid or perfluorocarboxylic acids are suitably classified as follows:

Group 1.—Monomer-insoluble aryldiazonium salts of perchloric acid and perfluorocarboxylic acids which are preferably activated by thermal means.

Group 2.—Monomer-soluble aryldiazonium salts of perchloric acid and perfluorocarboxylic acids which are preferably activated by thermal means.

Group 3.—Monomer-soluble aryldiazonium salts of perchloric acid and perfluorocarboxylic acids which are activated by light and thermal means.

Group 4.—Monomer-soluble aryldiazonium salts of perchloric acid and perfluorocarboxylic acids which cannot be activated by thermal means or are difficult to activate by thermal means but can be activated by light.

Aryldiazonium salts of perchloric acid and perfluorocarboxylic acids which can be activated by thermal means or light are those compounds in which the aryldiazonium salt of perchloric acid or perfluorocarboxylic acids that is inactive as catalyst alone, is decomposed under the action of heat or light to produce the activating system that initiates the polymerization, for example of cyclic acetals.

In other words crystalline aryldiazonium salts of perchloric acid or perfluorocarboxylic acids may be considered as constituting well defined potential ionic catalysts. They can be readily prepared, added in exact dosages and often exhibit monomer-solubility and are, therefore, especially valuable catalysts for use in ionic polymerization processes, especially for polymerizing cyclic ethers.

The aryldiazonium salts of perchloric acid and perfluorocarboxylic acids of Group 1 are only of minor commercial interest since, due to their insolubility in monomers, they cannot be distributed in an absolutely uniform manner in the monomer used so that a substantially homogeneous polymerization cannot practically be obtained. They are, therefore, not superior under comparable conditions to free perchloric acid or free perfluorocarboxylic acids, for example when used in acetal polymerization.

The monomer-soluble thermoactive aryldiazonium salts of Group 2 are far more effective in the process of the present invention due to their good dosability and homogeneous distribution in the monomer or in the mixtures of monomers used, and are by far superior to free perchloric acid or free perfluorocarboxylic acids under otherwise comparable polymerization conditions. In view of the fact that the ability of aryldiazonium salts of perchloric acid and perfluorocarboxylic acids to undergo thermal decomposition is substantially determined by their constitution, it is possible to synthesize an aryldiazonium salt which undergoes decomposition at a certain temperature, for example within the range of about 20° C. and 140° C. The selection of the aryldiazonium salt that is suitable for the polymerization largely depends on the initiating temperature of the polymerization. In general, aryldiazonium salts of perchloric acid or perfluorocarboxylic acids which decompose at a temperature in the range of 20° C. to 140° C. are especially suitable. In special cases, however, it is possible to use aryldiazonium salts of perchloric acid or perfluorocarboxylic acids having a lower or higher decomposition temperature.

The aryldiazonium salts of Group 3 which are monomer-soluble, thermoactive and light active are superior in some applications to those of Group 2, for example in the case of polymerization which proceeds slowly and has been thermally activated, the polymerization may be further promoted by light activation.

Because the bulk polymerization of many monomers, for example cyclic acetals and especially trioxane, is of considerable interest in view of the good space-time yields obtained with a minimum catalyst consumption, it is advantageous to prepare those aryldiazonium salts which are classified in Group 4 for use in the process of the present invention.

Bulk polymerizations carried out in the presence of the aryldiazonium salts which belong to Groups 1 to 3, that is in the presence of those compounds which are monomer-soluble or insoluble and thermally unstable and carried out on a pilot plant or on an industrial scale plant involve the disadvantage that after initiation of the exothermal polymerization, the decomposition of the diazonium salts can only be controlled to a very limited extent in view of the fact that dissipation of the polymerization heat as soon as it is evolved can only be achieved with an extensive apparatus.

This disadvantage can be overcome by using the aryldiazonium salts of Group 4. These specific aryldiazonium salts enable the catalyst to be initially dissolved in the monomer or monomer mixture at the polymerization temperature used and then subsequently to initiate the polymerization by light whenever and wherever desired.

The structure, nature, and number of substituents in the aryldiazonium salts of perchloric acid or perfluorocarboxylic acids not only determine their solubility and activation by thermal means or light in the monomer or monomer mixtures but determine also the activity of the catalyst system which becomes active by decomposition. Substituents in the aromatic system which act as electron donors may impair the activity of the diazonium salts.

It is likewise possible to use mixtures of different aryldiazonium salts of perchloric acid and perfluorocarboxylic acids, for example mixtures of compounds which preferably can be activated by thermal means and compounds which preferably can be activated by light.

An aryldiazonium salt is termed monomer-soluble if it dissolves homogeneously in the monomer at the polymerization temperature in the amount necessary for initiating polymerization. The amount of the polymerization activator or activators used may vary within wide limits. Polymerization may even be initiated by adding only traces of the above catalysts. When the catalysts are used in an amount of between about 0.001 to about 5 mol percent, advantageously 0.01 and about 1 mol percent, the polymerization proceeds with an industrially useful rate.

The process of this invention permits the polymerization of a number of monomers, for example isobutylene, styrene or vinyl ethers, and especially cyclic ethers. The process of this invention is especially suitable for bulk-polymerizing trioxane, polymers having very good properties being obtained.

The process of the present invention may be used for homopolymerizing or copolymerizing cyclic ethers, for example trioxane, ethylene oxide, tetrahydrofuran and diethylene glycol formal of the formula:

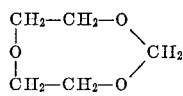

These monomers may also be copolymerized with one another.

The polymers obtained by the process of the present invention can be used for making shaped articles, fibers and films or foils.

The process of this invention can also be used for modifying or surface-coating shaped structures, for example films, foils, fibers or wires. These structures may be impregnated or sprayed, for example with a mixture prepared from one or more monomers in which an aryldiazonium salt of perchloric acid or of a perfluorocarboxylic acid is dissolved, and the polymerization may be initiated by heat and/or light. By covering these structures with masks or partially exposing them to light local polymer formation may be achieved.

By aryldiazonium salts of perchloric acid or perfluorocarboxylic acid which are capable of being activated by light there are understood those compounds that decompose under the action of normal sunlight. However, other light sources, for example a commercial metal-filament lamp or a luminous arc of sufficient capacity may also be used. Furthermore, it may be advantageous to increase the proportion of infrared or ultra-violet light in the light source according to the spectrum sensitiveness of the aryldiazonium salt used.

The following examples serve to illustrate the invention but they are not intended to limit it thereto, the parts being by weight unless otherwise stated.

*Example 1*

100 parts of trioxane were melted and, at 68° C., 0.015 part of 4-nitrophenyldiazonium-perchlorate was added which dissolved at once. After about one minute polymerization set in and after a short while the whole batch solidified to form a solid polymer block.

For completing the reaction, the batch was maintained for 1 hour at 68–70° C., the product was ground and boiled under reflux for one hour with a solution of 2% strength of ethanolamine in methanol. After having filtered off with suction, the product was washed with methanol until it was neutral and dried at 50° C. under reduced pressure. 93 parts of polymer were obtained. At 202° C. the product lost 0.15% of its weight per minute.

*Example 2*

100 parts of trioxane were melted and 0.02 part of 4-nitro - 2 - methylphenyldiazonium - trifluoroacetate was added at 90° C. The catalyst dissolved at once and polymerization set in after about 3 minutes. The polymer was further treated as described in Example 1. 89 parts of polymer were obtained.

*Example 3*

100 parts of trioxane were melted and 0.005 part of the compound

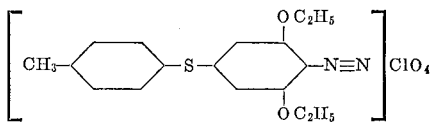

was added as catalyst at 60° C. The catalyst dissolved at once. The batch was divided into two halves and each half was introduced into a like vessel made of Jena glass. Vessel I was kept in a thermostat at 68° C. with the exclusion of light. Vessel II was exposed to the irradiation of a normal 250 watt lamp at a distance of 30 cm. About about 100 seconds polymerization set in in the irradiated vessel and the mixture became turbid. In vessel I no signs of polymerization were observed after 100 minutes. After said period of time vessel I was irradiated under the same conditions as vessel II. In this case, too, polymerization set in after about 100 seconds and after a short while the whole batch solidified to form a solid block.

*Example 4*

100 parts of liquid trioxane were mixed with 2 parts of ethylene oxide and 0.02 part of 4-nitrophenyl-diazonium-perchlorate was added at 62° C. The catalyst dissolved at once. Polymerization set in after about 50 seconds and the whole batch solidified within a short period of time to a solid polymer bloc. For completing the reaction the batch was maintained for 1 hour at 68–70° C., and then processed as described in Example 1. 90 parts of polymer were obtained which lost 0.09% of its weight per minute when heated at 202° C.

*Example 5*

5 parts of absolute diethylene glycol formal were combined at 20° C. with 0.08 part of the compound of the formula

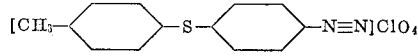

The yellow solution obtained was irradiated with an ultraviolet mercury lamp (about 100–120 seconds) until it became colorless. Polymerization set in already during the irradiation. In the course of the polymerization the polymer solidified to a solid colorless block which had substantially crystallized after 24 hours.

The block was processed as described in Example 1. 97% by weight of polymer were obtained, calculated on the diethylene glycol formal used.

I claim:

1. A method which comprises polymerizing a member selected from the group consisting of cyclic ether and mixtures of cyclic ethers in the presence of 0.001 to 5% by weight of a decomposable diazonium salt of an acid selected from the group consisting of perchloric acid and perfluorocarboxylic acids having 2 to 10 carbon atoms, the diazonium moiety of said salt having from one to two phenyl groups and being substituted by from one to three substituents selected from the group consisting of nitro, lower alkyl, lower alkoxy and combinations thereof.

2. The method of claim 1 wherein the diazonium salt is 4-nitrophenyldiazonium-perchlorate.

3. The method of claim 1 wherein the diazonium salt is 4-nitro-2-methylphenyldiazonium-trifluoroacetate.

4. The method of claim 1 wherein the diazonium salt is

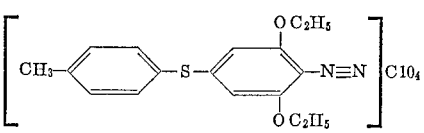

5. The method of claim 1 wherein the diazonium salt is

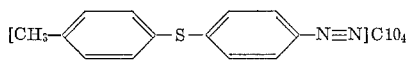

6. The method of claim 1, which comprises polymerizing trioxane.

7. The method of claim 1, which comprises polymerizing tetrahydrofuran.

8. The method of claim 1, which comprises polymerizing diethylene glycol formal.

9. The method of claim 1, wherein the diazonium salt used is activated by thermal means.

10. The method of claim 1, wherein the diazonium salt used is activated by light.

11. The method of claim 1, wherein the diazonium salt used is activated by the combined action of light and heat.

12. A method which comprises homopolymerizing trioxane in the presence of 0.001 to 5% by weight of a decomposable diazonium salt of an acid selected from the group consisting of perchloric acid and perfluorocarboxylic acids having 2 to 10 carbon atoms, the diazonium moiety of said salt having from one to two phenyl groups and being substituted by from one to three substituents selected from the group consisting of nitro, lower alkyl, lower alkoxy and combinations thereof.

13. A method which comprises homopolymerizing diethylene glycol formal in the presence of 0.001 to 5% by weight of a decomposable diazonium salt of an acid selected from the group consisting of perchloric acid and perfluorocarboxylic acids having 2 to 10 carbon atoms, the diazonium moiety of said salt having from one to two phenyl groups and being substituted by from one to three substituents selected from the group consisting of nitro, lower alkyl, lower alkoxy and combinations thereof.

14. A method which comprises copolymerizing trioxane with ethylene oxide in the presence of 0.001 to 5% by weight of a decomposable diazonium salt of an acid selected from the group consisting of perchloric acid and perfluorocarboxylic acids having 2 to 10 carbon atoms, the diazonium moiety of said salt having from one to two phenyl groups and being substituted by from one to three substituents selected from the group consisting of nitro, lower alkyl, lower alkoxy and combinations thereof.

15. A polymerizable composition consisting essentially of a member selected from the group consisting of cyclic ether and mixtures of cyclic ethers with a decomposable diazonium salt of an acid selected from the group consisting of perchloric acid and perfluorocarboxylic acids having 2 to 10 carbon atoms, the diazonium moiety of said salt having from one to two phenyl groups and being substituted by from one to three substituents selected from the group consisting of nitro, lower alkyl, lower alkoxy and combinations thereof.

16. A composition as defined in claim 15 wherein the decomposable salts is 4-nitro-phenyldiazoniumperchlorate.

17. A composition as defined in claim 15 wherein the decomposable salt is 4-nitro-2-methylphenyldiazoniumtrifluoroacetate.

18. A composition as defined in claim 15 wherein the decomposable salt is

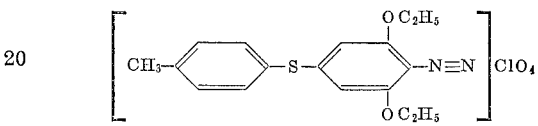

19. A composition as defined in claim 15 wherein the decomposable salt is

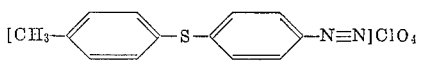

References Cited by the Examiner
UNITED STATES PATENTS

| | | | |
|---|---|---|---|
| 2,110,499 | 3/1938 | Carothers | 260—2 |
| 2,691,038 | 10/1954 | Engelhardt | 260—2 |
| 2,989,511 | 6/1961 | Schnizer | 260—67 |
| 3,122,525 | 2/1964 | Kern et al. | 260—67 |

FOREIGN PATENTS

| | | |
|---|---|---|
| 1,243,668 | 9/1960 | France. |
| 1,263,162 | 4/1961 | France. |
| 1,124,703 | 3/1962 | Germany. |

MURRAY TILLMAN, *Primary Examiner.*

JOSEPH R. LIBERMAN, *Examiner.*